United States Patent [19]
Bugosh

[11] Patent Number: 6,067,713
[45] Date of Patent: May 30, 2000

[54] METHOD OF MANUFACTURING A RACK AND PINION STEERING GEAR

[75] Inventor: Mark J. Bugosh, Sterling Heights, Mich.

[73] Assignee: TRW Inc., Lyndhurst, Ohio

[21] Appl. No.: 09/290,944

[22] Filed: Apr. 13, 1999

[51] Int. Cl.[7] .................................................. B21D 53/28
[52] U.S. Cl. .............................. 29/893.1; 29/505; 74/422
[58] Field of Search .................................. 29/893.1, 428, 29/505; 74/422, 498

[56] References Cited

U.S. PATENT DOCUMENTS

| | | |
|---|---|---|
| 3,673,662 | 7/1972 | Turnbull . |
| 3,758,938 | 9/1973 | Simmons et al. . |
| 3,956,801 | 5/1976 | Wood . |
| 3,979,968 | 9/1976 | Ceccherini ................................. 74/498 |
| 4,779,694 | 10/1988 | Adams ....................................... 74/498 |
| 5,713,116 | 2/1998 | Nickerson et al. . |

*Primary Examiner*—P. W. Echols
*Attorney, Agent, or Firm*—Tarolli, Sundheim, Covell, Tummino & Szabo L.L.P.

[57] ABSTRACT

A method of manufacturing a rack and pinion steering gear (10) comprises the steps of: providing a housing (12) with first and second chambers (36 and 42) and threads (44) which partially define the second chamber (42); positioning a rack (14) in the first chamber (36); positioning a yoke (70) in the second chamber (42); screwing threads (94) of a plug (90) into the threads (44) which at least partially define the second chamber (42) to cause the plug to press the yoke (70) into engagement with the rack (14) by rotating the plug about an axis (38) relative to the housing (12) in a first direction (A); and simultaneously deforming the threads (44) which at least partially define the second chamber (42) at a plurality of locations spaced about the axis (38) to limit the amount of rotation of the plug (90) in a second direction (B) about the axis opposite the first direction (A).

6 Claims, 3 Drawing Sheets

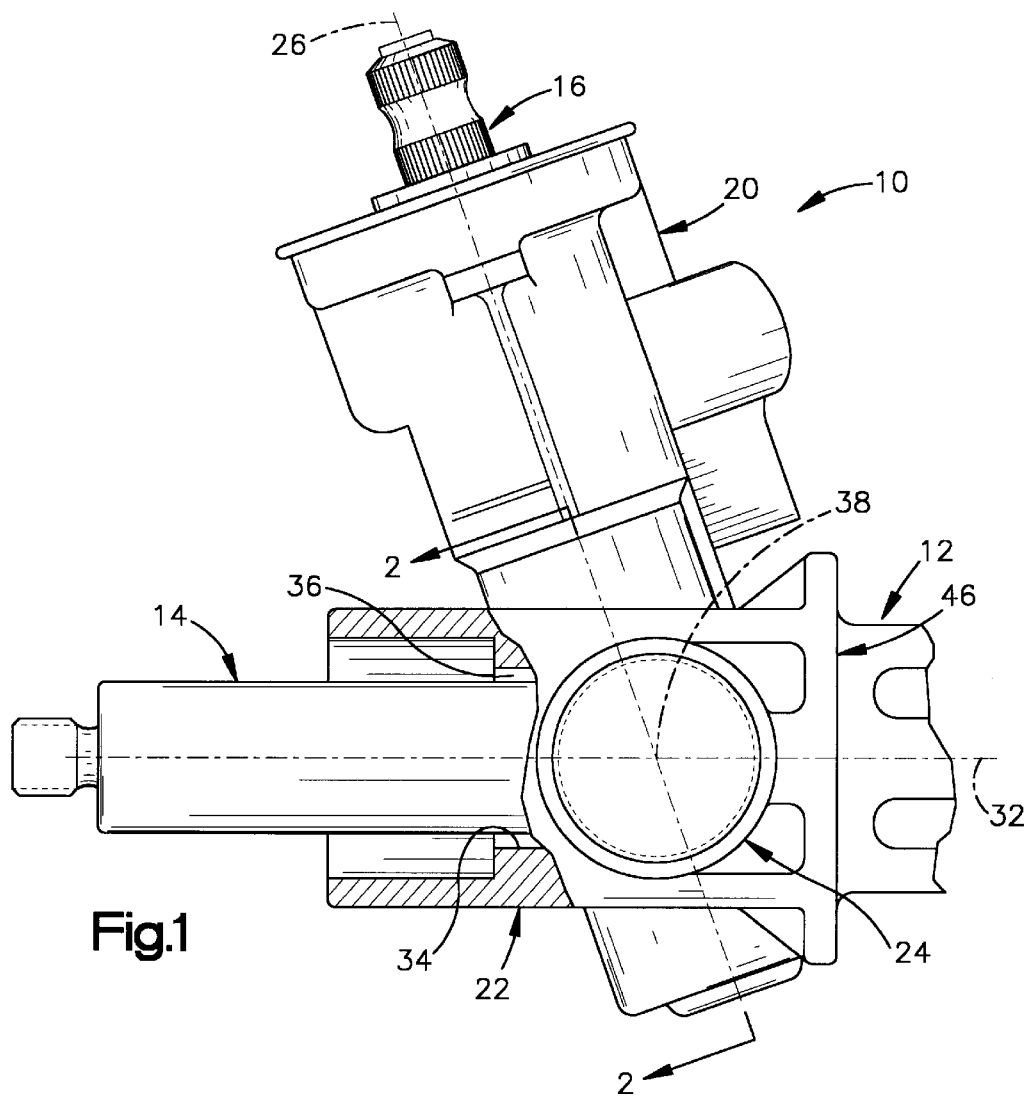
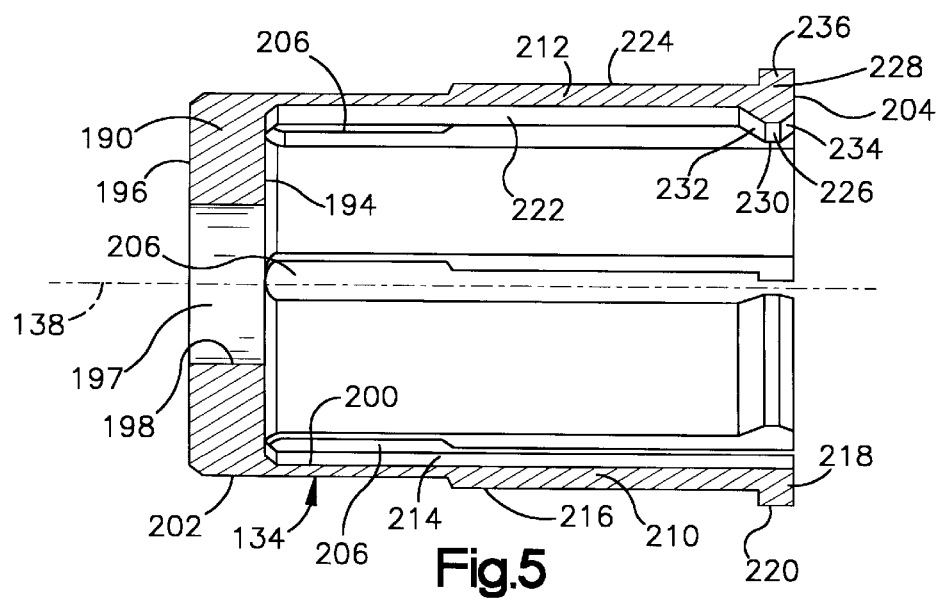

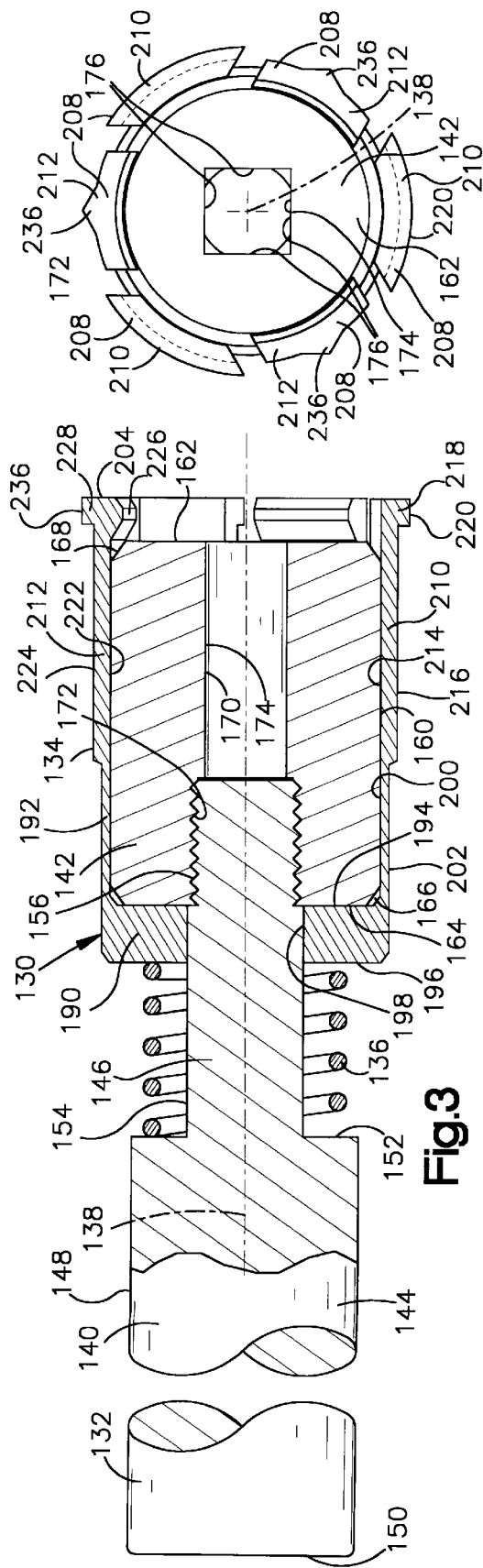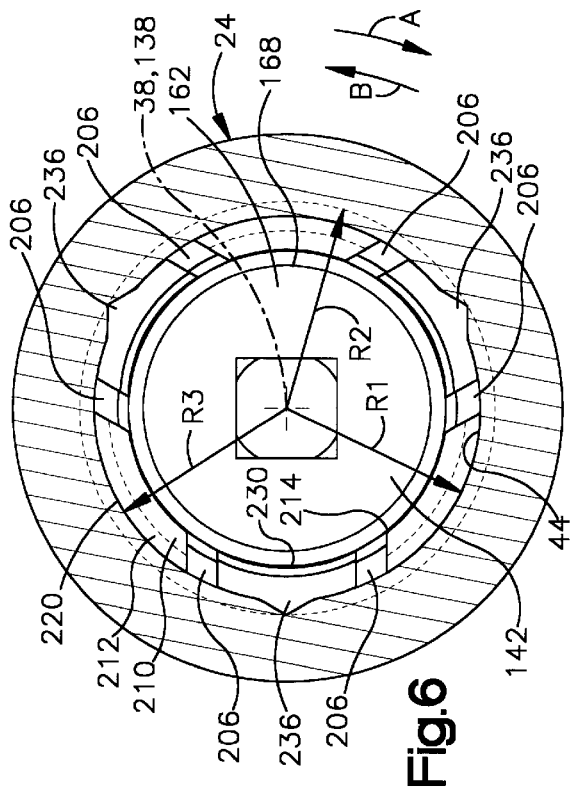

METHOD OF MANUFACTURING A RACK AND PINION STEERING GEAR

TECHNICAL FIELD

The present invention relates a method for manufacturing a rack and pinion steering gear.

BACKGROUND OF THE INVENTION

A known rack and pinion steering gear for use in turning steerable wheels of a vehicle includes a pinion which is disposed within a housing and which is operatively coupled with a vehicle steering wheel. A transversely extending rack is also disposed within the housing and is in meshing engagement with the pinion. Rotation of the pinion produces linear movement of the rack which causes the steerable wheels to turn laterally of the vehicle.

In the known rack and pinion steering gear, a yoke presses the rack into engagement with the pinion. The yoke is typically secured in the housing by a yoke plug which screws into the housing over an outboard end of the yoke. A helical spring is disposed between the yoke plug and the yoke to ensure firm meshing engagement between teeth on the rack and teeth on the pinion.

Various methods have been proposed for retaining the yoke plug in the housing in order to maintain the position of the yoke against the rack inside the housing.

SUMMARY OF THE INVENTION

The present invention is a method of manufacturing a rack and pinion steering gear which includes a housing having a first chamber for receiving the rack for movement in the first chamber. The housing has a second chamber extending into said housing and communicating with the first chamber. A yoke located in the second chamber slidably supports the rack. A plug has threads which screw into threads which at least partially define the second chamber. The plug presses the yoke into engagement with the rack.

The method comprises the steps of: providing the housing with the first and second chambers and the threads partially defining the second chamber; positioning the rack in the first chamber; positioning the yoke in the second chamber; screwing the threads of the plug into the threads which at least partially define the second chamber to cause the plug to press the yoke into engagement with the rack by rotating the plug about an axis relative to the housing in a first direction; and simultaneously deforming the threads which at least partially define the second chamber at a plurality of locations spaced about the axis to limit the amount of rotation of the plug in a second direction about the axis opposite the first direction.

The step of simultaneously deforming the threads includes the steps of: engaging the plug with a tool which has a plurality of thread deforming portions which move radially relative to the axis; and radially moving the thread deforming portions simultaneously. The tool has an axially movable cam rod which, when moved axially in one direction, causes radial movement of the thread deforming portions simultaneously.

The method further includes the step of moving the cam rod axially in the one direction to cause radial movement of the thread deforming portions simultaneously.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 a side view, partially in section, of a portion of rack pinion steering gear;

FIG. 3 is a sectional view of the tool shown in FIG. 2 with the tool being shown in a non-actuated condition;

FIG. 4 is an end view of the tool of FIG. 3;

FIG. 5 is a sectional view of a component of the tool of FIG. 3; and

FIG. 6 is a sectional view taken along line 6—6 in FIG. 2.

DESCRIPTION OF PREFERRED EMBODIMENTS

Figure 2:
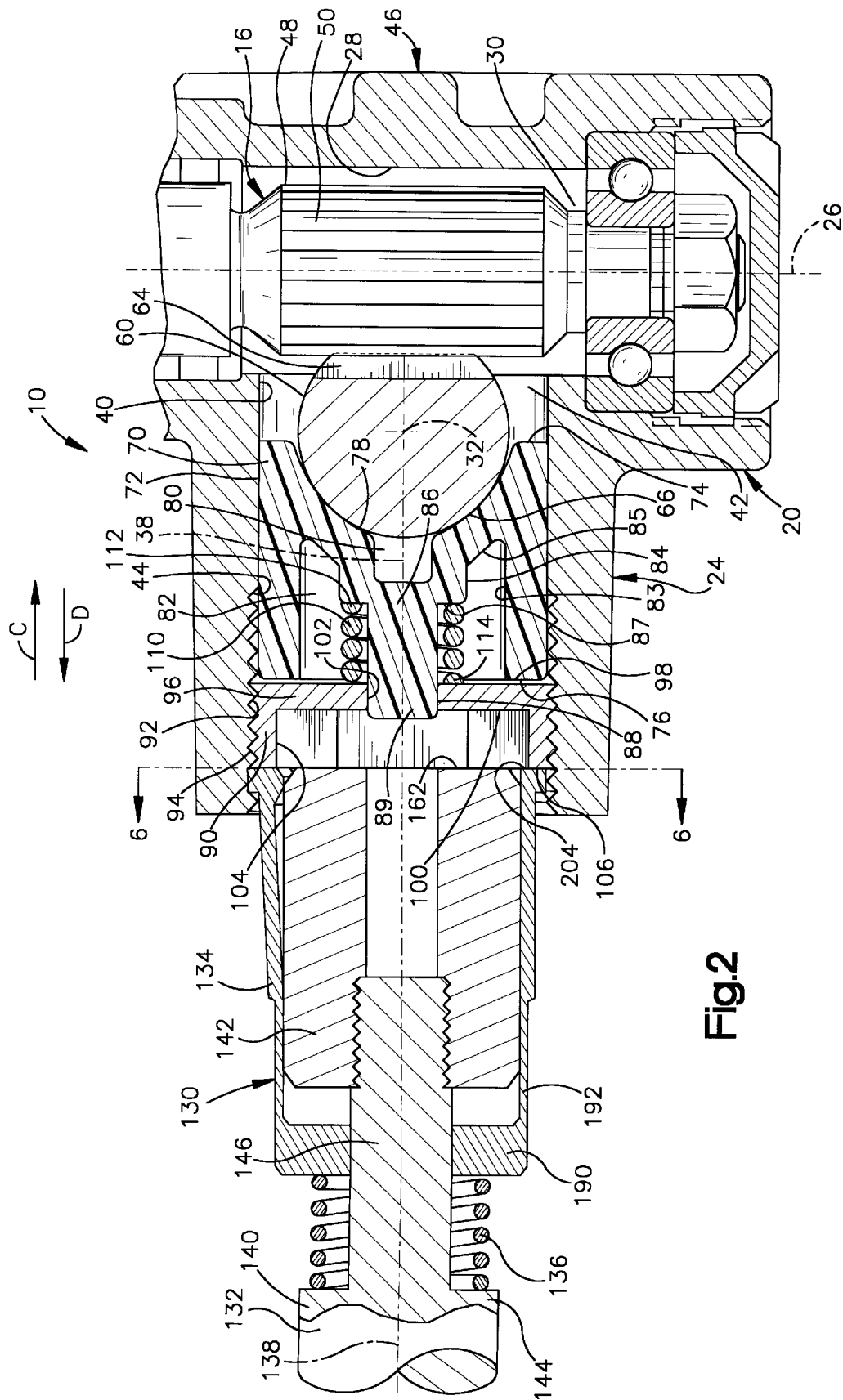
FIG. 2 is a sectional view taken along line 2—2 in FIG. 1 and illustrating a tool for use in the manufacture of the rack and pinion steering gear, the tool being shown in an actuated condition.

The present invention relates to a method for manufacturing a rack and pinion steering gear for use in turning the steerable vehicle wheels. The method is applicable to rack and pinion steering gears of various constructions. As representative of the present invention, FIG. 1 illustrates a rack and pinion steering gear 10 includes a housing 12, a rack 14, and a pinion 16.

The housing 12 includes a pinion portion 20, a rack portion 22, and a yoke portion 24. The pinion portion 20 is centered on a pinion axis 26 and includes an inner surface 28 (FIG. 2) defining a pinion chamber 30 in the housing 12. The rack portion 22 is centered on a rack axis 32 which extends transverse to the pinion axis 26. The rack portion 22 has an inner surface 34 (FIG. 1) defining a rack chamber 36 in the housing 12. The yoke portion 24 is centered on a yoke axis 38 which extends transverse to the pinion axis 26 and perpendicular to the rack axis 32. The yoke portion 24 has an inner surface 40 (FIG. 2) defining a yoke chamber 42 in the housing 12. The inner surface 40 defining the yoke chamber 42 includes a threaded surface portion 44. The threaded surface portion 44 has a minor radius R1 (FIG. 6) and a major radius R2. The pinion chamber 30, the rack chamber 36, and the yoke chamber 42 intersect one another in a junction section 46 (FIG. 2) of the housing 12.

The pinion 16 is disposed in the pinion chamber 30 in the pinion portion 20 of the housing 12 and is rotatable about the pinion axis 26. The pinion 16 is operatively connected with a vehicle steering wheel (not shown) as is known in the art. The pinion 16 has an outer surface 48 which includes teeth 50.

The rack 14 is partially disposed in the rack chamber in the rack portion 22 of the housing 12. Opposite ends (not shown) of the rack 14 project beyond the housing 12 and are adapted to be connected with steerable vehicle wheels (not shown) as is known in the art. The rack 14 is movable in opposite directions along the rack axis 32 to effect turning of the steerable wheels in opposite directions.

The rack 14 has a generally cylindrical outer surface 60. A portion of the rack 14 includes teeth 64 formed in the outer surface 60 of the rack. The teeth 64 on the outer surface 60 of the rack 14 are meshed with the teeth 50 on the outer surface 48 of the pinion 16 in the junction section 46 of the housing 12. Diametrically opposite the teeth 64, the outer surface 60 of the rack 14 comprises a cylindrical surface portion 66.

The steering gear 10 further includes a yoke 70, a yoke plug 90, and a yoke spring 110. The yoke 70 is centered on the yoke axis 38 and disposed in the yoke chamber 42 in the housing 12. The yoke 70 has a cylindrical outer surface 72 and first and second end surfaces 74 and 76, respectively. The outer surface 72 is complimentary to the inner surface 40 defining the yoke chamber 42. The first end surface 74 includes a concave surface 78 centered on the yoke axis 38. A recess 80 is formed in the concave surface 78 and is centered on the yoke axis 38.

The second end surface 76 of the yoke 70 includes an annular spring cavity 82 centered on the yoke axis 38 and partially defined by three cavity surfaces 83, 84, and 85. A cylindrical spring pilot 86 projects through the spring cavity 82 and beyond the second end surface 76 of the yoke 70. The spring pilot 86 is centered on the yoke axis 38 and includes first and second pilot surfaces 87 and 88, respectively, which further define the spring cavity 82. The spring pilot 86 includes an end portion 89.

The yoke plug 90 is centered on the yoke axis 38 and disposed in the yoke chamber 42 in the housing 12. The yoke plug 90 includes a peripheral surface 92 having threads 94 which mate with the threaded surface portion 44 of the inner surface 40 defining the yoke chamber 42. The yoke plug 90 has a radially extending inner end wall 96 defined by inner and outer end wall surfaces 98 and 100, respectively. The end wall 96 includes a pilot opening (not numbered) defined by a cylindrical inner surface 102 which is centered on the yoke axis 38. The end portion 89 of the spring pilot 86 on the yoke 70 projects through the pilot opening in the end wall 96. The yoke plug 90 further includes a hexagonal inner surface 104 and an outer end wall 106 extending radially between the hexagonal inner surface and the threaded peripheral surface 92.

The yoke spring 110 is centered on the yoke axis 38 and is disposed between the yoke 70 and the yoke plug 90 in the yoke chamber 42 in the housing 12. The yoke spring 110 fits over the spring pilot 86 on the yoke 70. A first end 112 of the yoke spring 110 engages the first pilot surface 87. A second end 114 of the yoke spring 110 engages the inner end surface 98 of the inner end wall 96 of the yoke plug 90. The yoke spring 110 biases the yoke 70 toward the rack 14.

A tool 130 is used in the manufacture of the rack and pinion steering gear 10. The tool 130 includes a cam rod 132, a sleeve 134, and a tool spring 136. The cam rod 132 is centered on a tool axis 138 and includes a rod section 140 and a cam section 142. The rod section 140 is made of hardened steel and has an elongate main body portion 144 and a neck portion 146. The main body portion 144 has a cylindrical outer surface 148 (FIG. 3) and radially extending first and second end surfaces 150 and 152, respectively. The neck portion 146 of the rod section 140 projects axially from the second end surface 152 of the main body portion 144. The neck portion 146 includes a cylindrical outer surface portion 154 and a threaded outer surface portion 156.

The cam section 142 of the cam rod 132 is tubular in shape and is made of hardened steel. The cam section 142 has a cylindrical outer surface 160 and inner and outer end surfaces 162 and 164, respectively. An annular cam surface 166 connects the cylindrical outer surface 160 with the outer end surface 164. An annular chamfer surface 168 connects the cylindrical outer surface 160 with the inner end surface 162.

The cam section 142 of the cam rod 132 has an inner surface 170 which includes a generally cylindrical threaded surface portion 172. The inner surface 170 in the cam section 142 further includes a drive surface portion 174 defined by four planar surfaces 176 which extend perpendicular to one another and which provide the drive surface portion with a square shape in cross-section. The cam section 142 is attached to the rod section 140 by screwing the threaded surface portion 172 of the cam section onto the threaded outer surface portion 156 of the neck portion 146 of the rod section. The drive surface portion 174 of the cam section 142 receives a conventional square drive tool (not shown) for rotating the cam section to tighten the cam section onto the rod section 140.

The sleeve 134 is tubular in shape and is made from hardened steel. The sleeve 134 encircles the cam section 142 of the cam rod 132 and partially encircles the neck portion 146 of the rod section 140 of the cam rod. The sleeve 134 includes a radially extending end wall 190 and an axially extending side wall 192. The end wall 190 is disposed between the main body portion 144 of the rod section 140 of the cam rod 132 and the cam section 142 of the cam rod. The end wall 190 is defined by an inboard surface 194 and an outboard surface 196. The end wall 190 includes an opening 197 (FIG. 5) defined by a cylindrical surface 198 which is centered on the tool axis 138. The neck portion 146 of the rod section 140 of the cam rod 132 projects through the opening 197 in the end wall 190 of the sleeve 134 as shown in FIG. 3.

The side wall 192 of the sleeve 134 has cylindrical inner and outer surfaces 200 and 202, respectively, and terminates at a terminal end surface 204. The side wall 192 includes six identical slots 206 (FIGS. 5 and 6) which extend axially from the terminal end surface 204 toward the end wall 190 of the sleeve 134. The six slots 206 divide the side wall 192 into six deflectable tabs 208 (FIG. 4). A first group of the six deflectable tabs 208 comprises three tabs spaced approximately 120° apart. A second group of the six deflectable tabs 208 comprises three tabs 212 also spaced 120° apart, with a respective one of the second group of tabs 212 being disposed circumferentially between two of the tabs 210 in the first group.

Each tab 210 in the first group of tabs has cylindrical inner and outer surfaces 214 and 216 (FIG. 3), respectively, and a flange 218 adjacent the terminal end surface 204 of the sleeve 134. The flange 218 on each of the tabs 210 in the first group of tabs has an arcuate peripheral surface 220 with a radius R3 (FIG. 6) which is slightly less than the minor diameter R1 of the threaded surface portion 44 in the yoke chamber 42 of the housing 12.

Each tab 212 in the second group of tabs has cylindrical inner and outer surfaces 222 and 224 (FIG. 3), respectively. Adjacent the terminal end surface 204 of the sleeve 134, each tab 212 in the second group of tabs includes an inwardly projecting engagement portion 226 and an outwardly projecting thread deforming portion 228. The engagement portion 226 of each tab 212 is defined by a cylindrical surface segment 230 (FIG. 5) and first and second tapered surfaces 232 and 234, respectively. The first tapered surface 232 extends between the cylindrical surface segment 230 and the inner surface 222 of each of the tabs 212 in the sleeve 134. The second tapered surface 234 extends between the cylindrical surface segment 230 and the radially extending terminal end surface 204 of the sleeve 134. The thread deforming portion 228 of each tab 212 in the second group of tabs comprises a radially extending V-shaped tooth 236. In a non-actuated condition of the tool 130 shown in FIGS. 3 and 4, the V-shaped teeth 236 on the tabs 212 of the sleeve 134 have a radius which is substantially similar to the radius R3 of the peripheral surfaces 220 on the first group of tabs 210.

The tool spring 136 is disposed between the cam rod 132 and the sleeve 134. One end of the tool spring 136 engages the outboard surface 196 of the end wall 190 of the sleeve 134. The other end of the tool spring 136 engages the second end surface 152 of the rod section 140 of the cam rod 132. The tool spring 136 biases the rod section 140 of the cam rod 132 away from the sleeve 134.

The manufacture of the steering gear 10 includes positioning the rack 14 and the pinion 16 in their respective chambers 36 and 30, respectively, in the housing 12 as described above. The yoke 70 and the yoke plug 90 are then positioned in the yoke chamber 42 in the housing 12 as described above. The yoke plug 90 screws into the yoke chamber 42 by rotation about the yoke axis 38 in a direction A (FIG. 6). When the yoke plug 90 is screwed into its permanent position (shown in FIG. 2) in the yoke chamber 38, the bias of the yoke spring 110 presses the concave surface 78 of the yoke 70 against the cylindrical surface portion 66 of the rack 14 which, in turn, presses the teeth 64 on the rack into firm engagement with the teeth 50 on the pinion 16. The spring-biased yoke 70 prevents rattling of the engaged teeth 50, 64 and absorbs dynamic loads transmitted through the rack 14.

The tool 130 is inserted into the yoke chamber 42 in the housing 12 and the tool axis 138 is aligned with the yoke axis 38. The terminal end surface 204 of the sleeve 134 is brought into engagement with the outer end wall 106 of the yoke plug 90. At this point in the manufacturing process, the tool 130 is in the non-actuated condition shown in FIGS. 3 and 4. The sleeve 134 of the tool 130 is able to fit into the yoke chamber 42 in part because the radius R3 of the peripheral surfaces 220 on the first group of tabs 210 is slightly less than the minor diameter R1 of the threaded surface portion 44 in the yoke chamber 42 of the housing 12. Further, the tool 130 is able to fit into the yoke chamber 42 because, in the non-actuated condition, the V-shaped teeth 236 have a radius which is substantially similar to the radius R3 and which is slightly less than the minor diameter R1.

The cam rod 132 is then moved axially in a first axial direction C (FIG. 3), against the bias of the tool spring 136, relative to the sleeve 134 and toward the yoke plug 90. This may be accomplished by manually striking the first end surface 150 of the rod section 140 of the cam rod 132 with a tool, such as a hammer (not shown). It is also contemplated that the cam rod 132 could alternatively be moved by a hydraulic ram (not shown).

Initially, the axial movement of the cam rod 132 forces the cam surface 166 on the cam section 142 of the cam rod into engagement with the first tapered surface 232 on each of the tabs 212 in the second group of tabs on the sleeve 134. Additional axial movement of the cam rod 132 relative to the sleeve 134 moves the cam surface 166 of the cam rod into engagement with the cylindrical surface segment 230 on each tab 212 in the second group of tabs. As the cam rod 132 continues to move in the first axial direction C, the cylindrical surface segments 230 slide on the cam surface 166 and are brought into engagement with the cylindrical outer surface 160 of the cam section 142 as is shown in FIG. 2.

The axial movement of the cam section 142 relative to the engagement portion 226 of the tabs 212 on the sleeve 134 causes corresponding radial movements by each of the thread deforming portions 228 on the sleeve 134. As the cylindrical surface segments 230 of each tab 212 move into engagement with the outer surface 160 of the cam section 142, each of the three V-shaped teeth 236 moves radially outward and simultaneously engages the threaded surface portion 144 in the yoke chamber 42 and begins to deform the threaded surface portion. In the actuated condition illustrated in FIGS. 2 and 6, the V-shaped teeth 236 are forced into the threaded surface portion 44 and create a discontinuity in the threaded surface portion at three circumferential locations corresponding to the locations of the three V-shaped teeth 236. The discontinuities comprise material enlargements within the threaded surface portion 44 at the three locations and are caused by a forcing of the material of the threads in the threaded surface portion in both axial and circumferential directions.

After the threaded surface portion 44 has been deformed by the V-shaped teeth 236, the tool spring 136 moves the cam rod 132 away from the sleeve 134 in a second axial direction D (FIG. 2) opposite the first axial direction C and returns the tool 130 to the non-actuated condition. With the tool 130 in the non-actuated condition, the tool is removed from the yoke chamber 42 in the housing 12. The three circumferential locations of discontinuity in the threaded surface portion 44 of the yoke chamber 42 limit the movement of the yoke plug 90 in the yoke chamber. The yoke plug 90 can be rotated to move toward the yoke 70 in the first axial direction C, but can only be rotated a limited amount in the second axial direction D to move the yoke plug away from the yoke. Such movement of the yoke plug 90 away from the yoke 70 is blocked once the threads 94 on the yoke plug engage the discontinuities created in the threaded surface portion 44 of the yoke chamber 42.

From the above description of the invention, those skilled in the art will perceive improvements, changes and modifications. Such improvements, changes and modifications within the skill of the art are intended to be covered by the appended claims.

Having described the invention, I claim:

1. A method of manufacturing a rack and pinion steering gear which includes a housing having a first chamber for receiving the rack for movement in the first chamber, the housing having a second chamber extending into said housing and communicating with the first chamber, a yoke in the second chamber slidably supporting the rack, and a plug having threads which screw into threads which at least partially define said second chamber, the plug pressing the yoke into engagement with the rack, said method comprising the steps of:

providing said housing with said first and second chambers and said threads partially defining said second chamber;

positioning said rack in said first chamber;

positioning said yoke in said second chamber;

screwing said threads of said plug into said threads which at least partially define said second chamber to cause said plug to press said yoke into engagement with said rack by rotating said plug about an axis relative to said housing in a first direction; and simultaneously deforming said threads which at least partially define said second chamber at a plurality of locations spaced about said axis to limit the amount of rotation of said plug in a second direction about said axis opposite said first direction.

2. A method as defined in claim 1 wherein said step of simultaneously deforming said threads includes the steps of:

engaging said plug with a tool which has a plurality of thread deforming portions which move radially relative to said axis; and radially moving said thread deforming portions simultaneously.

3. A method as defined in claim 2 wherein said tool has an axially movable cam rod which, when moved axially in one direction, causes radial movement of said thread deforming portions simultaneously, said method further including the step of moving said cam rod axially in said one direction to cause radial movement of said thread deforming portions simultaneously.

4. A method as defined in claim 3 wherein said tool includes three thread deforming portions which are equally spaced about said axis, said step of simultaneously deforming said threads including simultaneously deforming said threads at locations spaced 120° apart around said axis.

5. A method as defined in claim 3 wherein said cam rod is biased by a spring in another direction opposite said one direction, said method further including the step of moving said cam rod against the bias of said spring when moving the cam rod axially in said one direction.

6. A method as defined in claim 2 wherein said thread deforming portions are V-shaped teeth and said step of simultaneously deforming said threads includes forcing each of said V-shaped teeth into the threads which at least partially define said second chamber to form a discontinuity in said threads and push material of said threads axially and circumferentially to form a material enlargement in said threads which blocks rotation of said plug in said second direction.

\* \* \* \* \*